April 19, 1966     D. L. DARLING     3,246,913
CONVERTIBLE TANDEM SUSPENSION SYSTEM FOR A SEMITRAILER
Filed April 6, 1964     2 Sheets-Sheet 1
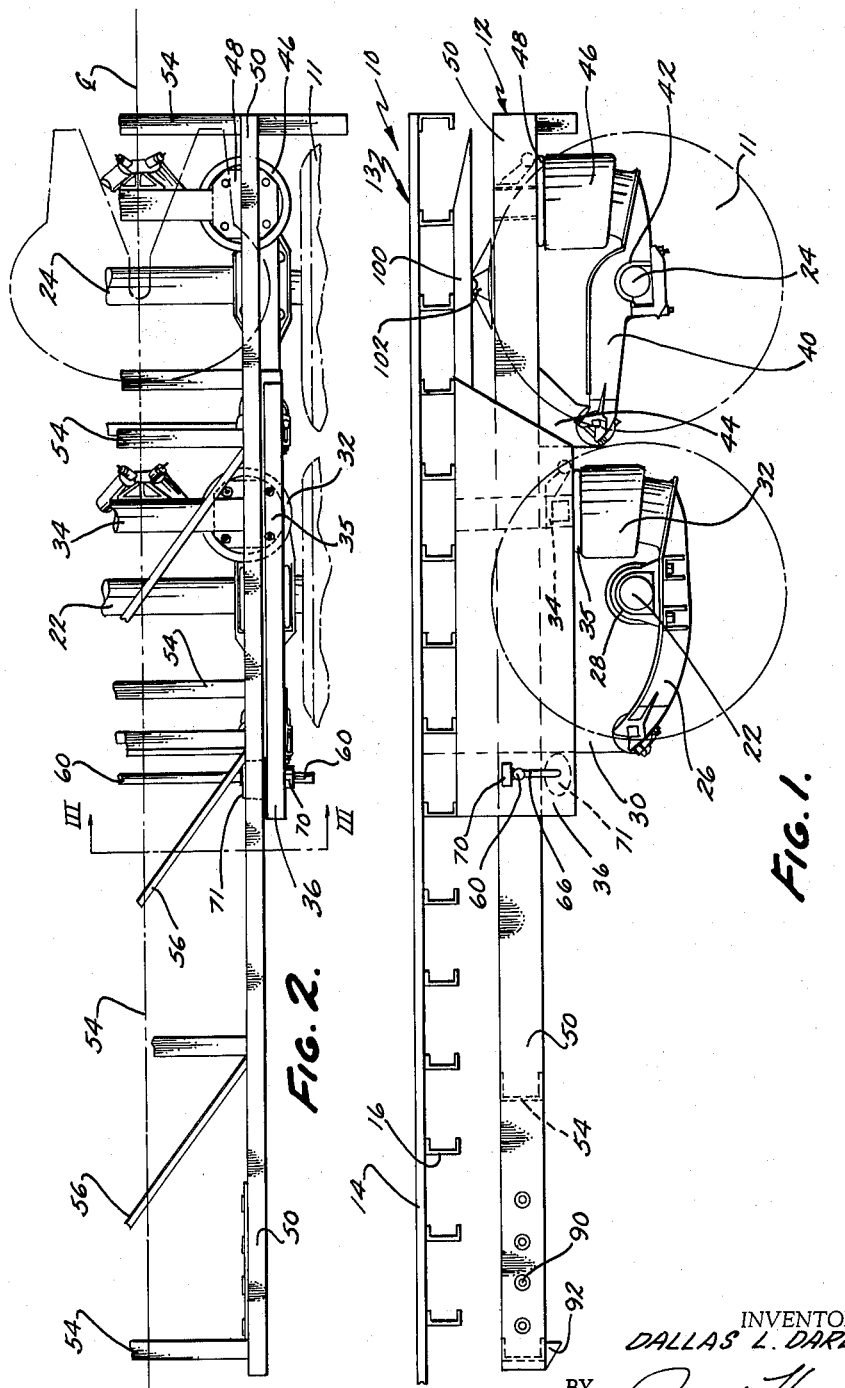
INVENTOR.
DALLAS L. DARLING
BY
ATTORNEYS April 19, 1966 D. L. DARLING 3,246,913
CONVERTIBLE TANDEM SUSPENSION SYSTEM FOR A SEMITRAILER
Filed April 6, 1964 2 Sheets-Sheet 2

INVENTOR.
DALLAS L. DARLING
BY *Price & Heneveld*
ATTORNEYS

3,246,913
Patented Apr. 19, 1966

3,246,913
CONVERTIBLE TANDEM SUSPENSION SYSTEM FOR A SEMITRAILER
Dallas L. Darling, 513 Mulford Drive SE.,
Grand Rapids, Mich.
Filed Apr. 6, 1964, Ser. No. 357,523
3 Claims. (Cl. 280—418)

This invention relates to semitrailers, and more particularly relates to a convertible tandem suspension system for a semitrailer.

Competition in the trucking business today has stimulated new methods of operation, for example "piggy back" hauling of semitrailers on railroad flat cars. These new methods create a certain degree of independence of the semitrailers to the cabs. Consequently in any one location only a limited number of truck cabs with fifth wheels might be available for hauling the trailers. Since only one semitrailer can be hauled at a time by each cab, a loss of time and money often results in idle trailers. This creates an economic disadvantage to the trucking business. The solution would appear to be the capacity for one cab to haul more than one semitrailer. This advance would be especially advantageous in transporting empty semitrailers or those with a relatively lightweight load.

It is therefore an object of this invention to provide a semitrailer suspension system that enables more than one semitrailer to be hauled by the same cab. The two trailers are capable of attachment to each other in tandem to be simultaneously hauled.

It is another object of this invention to provide a semitrailer suspension system that allows safe reliable attachment of a second semitrailer to the rear of the first semitrailer by the use of a fifth wheel assembly that fits the conventional king pin of the rearmost trailer. The attachment is therefore secure, quickly attached, and just as readily detached.

It is another object to provide such an attachment that allows support of the front end of the rear semitrailer on the resilient suspension system on the rear of the front semitrailer.

It is another object of this invention to provide a double axle semitrailer suspension system capable of supporting a full load in the semitrailer, or alternatively allowing attachment of a second semitrailer to it while supporting the front end of the second trailer.

It is another object of this invention to provide a semitrailer suspension system that supports a fifth wheel assembly for tandem attachment of a second semitrailer, but also allows shifting movement of the additional fifth wheel assembly to a position allowing normal loading and unloading of the first semitrailer.

These and several other objects of this invention will become apparent upon studying the following specification in conjunction with the drawings in which:

FIG. 1 is a side elevational view of the suspension system on a semitrailer;

FIG. 2 is a fragmentary plan view of the suspension system itself from FIG. 1;

Referring now specifically to the drawings, the semitrailer 10 including the suspension system 12 and semitrailer head 13 is shown. The wheels 11 are shown in phantom to more clearly reveal the inner mechanism. The front end of the trailer (not shown since conventional) includes a conventional king pin assembly which interconnects with a conventional fifth wheel assembly on a truck cam (not shown).

Figure 4:
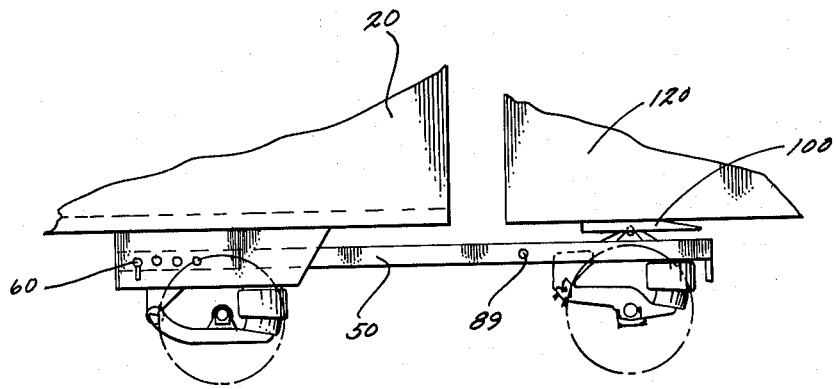
FIG. 4 is a fragmentary elevational view of a pair of semitrailers attached in tandem fashion using the novel suspension system.

The semitrailer bed frame is of generally conventional construction, including a platform 14 mounted on a plurality of transverse channel-type joists 16 from front to rear. Under normal conditions, the bed may include a van enclosure 20 (FIG. 4).

The double axle suspension system 12 supports the rear end of this bed. It includes a pair of adjacent spaced axles 22 and 24 mounted one behind the other. Axle 22 includes a pair of cantilever suspension arm supports 26 on opposite sides thereof. Each is pivotally mounted intermediate its ends to the axle with a bearing 28. Each has its forward end pivotally attached to a fixed mounting bracket 30. An air spring 32 extends between the rear end of the arm and its mounting plate 35 which is secured to a transverse beam 34.

This beam is secured at its opposite ends to a pair of like, depending girders or brackets in the form of elongated, forwardly extending, generally rectangular, rigid supports having their upper ends attached securely by welding to the underside of channels 16. Brackets 30 are secured to these girders 36 forwardly of the forward air springs 32 and front axle 22.

The second rear axle 24 is likewise mounted on a pair of spaced pivot suspension arms 40 by bearings 42 intermediate the ends of the arms. The front end of each arm is pivotally attached to supports 44, while the rear end has an air spring 46 mounted thereon. The attachment plate 48 on the upper end of the rear springs is secured to a special shiftable carriage 12.

Figure 3:
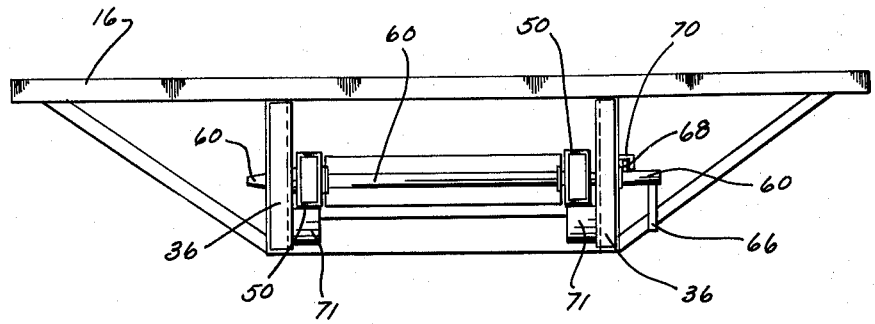
FIG. 3 is a sectional view taken on plane III—III of FIG. 2.

The framework of this carriage includes a pair of spaced, forwardly extending elongated beams 50. These beams are fitted telescopically inside the straddling girders 36 (FIG. 3). These spaced beams are interconnected with a plurality of spaced, channel crossbars 54 from front to rear, and preferably a plurality of diagonal tie members 56. Brackets 44 are secured to these beams. These beams, and therefore this carriage, are pinned to girders 36 by a transverse elongated cylindrical locking bar 60. This bar extends through aligned orifices in the girders and carriage. Normally each girder has one opening and the beams of the carriage have several spaced openings. This locking pin extends clear through the telescopically interfitting carriage and joists as shown in FIG. 3. It has a transverse, depending handle 66 on one end for retraction and insertion of the pin. To retain the pin in its inserted position, it includes a small transverse ear 68 opposite handle 66, to fit behind a retention collar 70 when bar 60 is rotated. The collar is positioned above the bar and prevents retraction of the pin when the handle 66 is downward as biased by its weight (FIG. 1).

Beams 50, guided between straddle girders 36, rest on a pair of bearing supports 71 attached to the inside face of girders 36. When pin 60 is withdrawn, the carriage and rear axle suspension can be shifted fore and aft from a forward position beneath the bed as illustrated in FIGS. 1 and 2, to a rearward position where the rear axle and its suspension system projects out behind the semitrailer. In the forward position, locking pin 60 is inserted through openings 89 in the carriage (FIG. 4). In the rear position, locking pin 60 can be inserted through any of a plurality of closely spaced, adjacent orifices 90 at the forward end of beams 50. Maximum rearward movement is limited by abutment of downwardly projecting stops 92 against bearing supports 71.

Mounted above the rear axle suspension on carriage 12 is a fifth wheel connector mechanism, including a conventional fifth wheel 100 and its mount 102. It projects upwardly but has a slight clearance beneath the bottom of channels 16.

In the forward retracted position of the rear axle assembly, therefore, the fifth wheel mechanism, due to its small clearance with respect to the frame, cooperates to form a supplemental load support for the front axle assembly. That is, a heavy load placed on the trailer bed not only applies force to the front axle 22 by exerting stress on straddle girders 36, air springs 32, arms 26, and axle 22, but also applies force to fifth wheel 100 and its mount 102, thence to the special carriage frame, air springs 46, arms 40 and axle 24. Also, in this position the suspension system allows normal access to the semitrailer for loading and unloading.

When the mechanism is secured in its retracted position (FIGS. 1 and 2), it is retained against forward or rearward movement to provide support for the trailer bed.

If a second semitrailer is to be hauled behind the first semitrailer, for example, when both trailers are empty or the front trailer has a relatively light load not requiring a double axle suspension, the rear axle suspension assembly is extended by withdrawing locking pin 60, blocking the rear wheels with any suitable means, and driving forwardly to pull the trailer frame and front axle assembly forward. This in effect causes rearward extension telescopically of carriage 12 within girders 36 until one pair of the openings 90 of the orificed beams is aligned with the orifices in the girders 36. Rod 60 is then inserted with handle 66 sideways, after which handle 66 is pivoted downwardly to cause ear 68 to catch behind collar 70. The fifth wheel 100 is then extended clear of van 20, in unobstructed position, allowing attachment of a second, like, semitrailer 120 (FIG. 4) on fifth wheel 100.

In this position, the two trailers can be hauled in tandem fashion by the same cab to the desired destination. The attachment is secure, safe and reliable as well as allowing attachment of a semitrailer using its conventional king pin assembly. The front end of the rear trailer is nicely supported on the spring suspension apparatus. A certain freedom of vertical movement of the rearmost axle assembly is achieved because of its attachment on the pivot pin 60 which locks the rear axle assembly to the front semitrailer frame.

After the truck reaches its destination, and the rear semitrailer is removed, the unit can be quickly retracted by withdrawing locking bar 60, placing blocks behind the rear wheels of the rear axle assembly, and reversing the truck until opening 89 is again aligned with the corresponding opening in girders 36. In this position, therefore, the foremost trailer can be loaded or unloaded without interference from this fifth wheel assembly. Moreover, the front trailer can utilize the rear wheel assembly for additional support in the manner already described.

Certain additional advantages will appear to those in the art upon studying this specific preferred form of the invention. For example, it is conceivable that in the broader aspects of this invention the front axle assembly can be mounted to shift with shifting of the rear axle assembly, to redistribute the load on the single axle. However, these are modifications which would be obvious to one skilled in the art once the unique concept set forth herein is understood. Consequently this invention is not to be limited to the specific preferred form illustrated but only by the scope of the appended claims and the reasonable equivalents to those defined therein.

I claim:
1. In combination: a trailer frame; a pair of adjacent suspension axle assemblies under the rear of said frame, one behind the other; the foremost of said assemblies having mounting means to said frame to secure it; the rearmost of said assemblies having independent mounting means including forwardly extending support means; guide means mounted beneath said frame forwardly of said rearmost assembly, and interengaged with said support means; said support means being shiftable fore and aft in said guide means, and said rearmost assembly being shiftable therewith, independently of said foremost assembly, from a forward position adjacent said foremost assembly to a rearward position spaced substantially from said rearmost assembly; said rearmost assembly having its axle beneath said frame in said forward position and behind said frame in said rearward position; locking means under said frame lockingly engageable with said support means in said forward and rearward positions to secure said rearmost assembly against further movement; a fifth wheel connector mounted on said rearmost assembly, shiftable therewith, from a retracted forward position beneath said frame to an extended rearward unobstructed position behind said frame; said fifth wheel assembly being normally spaced slightly beneath said frame to enable fore and aft movement of said fifth wheel and rearmost assembly and enabling said frame when loaded, to bear on said fifth wheel and rearmost assembly.

2. In combination: a trailer frame; a pair of adjacent suspension axle assemblies under the rear of said frame, one behind the other; the foremost of said assemblies having mounting means to said frame to secure it; the rearmost of said assemblies having independent mounting means including forward extending attachment means; bracket means suspended beneath said frame and receiving said attachment means; said bracket means including guide means engageable with said attachment means to allow movement of said attachment means with respect to said bracket means, independently of said foremost assembly, fore and aft of said frame from a forward position adjacent said foremost assembly to a rearward position spaced substantially from said rearmost assembly; shiftable locking means engageable between portions of said bracket means and said attachment means in shifted positions of the latter; a fifth wheel connector mounted on said rearmost assembly generally above the axle thereof, and shiftable therewith; said connector and axle being shiftable from a forward position beneath said frame to a rearward position extended behind said frame in an unobstructed arrangement; said fifth wheel connector normally having sufficiently small clearance from said frame in said forward position to allow free movement thereof when said frame is not loaded and to provide supplemental support to a load on said frame, and having sufficient extension behind said frame in said rearmost position to receive a tandem trailer attachment.

3. The combination in claim 2 wherein said attachment means comprises a pair of interconnected orificed beams, said bracket means comprises a pair of rigid orificed mounting girders alongside said beams, and said locking means comprises an elongated transverse pin extending through selected orifices of said beams and said mounts to form a pivot connection therebetween.

References Cited by the Examiner

UNITED STATES PATENTS

| | | | |
|---|---|---|---|
| 2,676,815 | 4/1954 | Bennett | 280—405 |
| 2,682,420 | 6/1954 | Chelf | 280—407 |
| 3,061,332 | 10/1962 | Goulden | 280—81 X |
| 3,066,953 | 12/1962 | Chosy | 280—418 |
| 3,093,388 | 6/1963 | Kulyk | 280—81 |
| 3,102,738 | 9/1963 | DeRoshia | 280—81 X |
| 3,108,822 | 10/1963 | Tantlinger et al. | 280—81 X |
| 3,112,935 | 12/1963 | Gregg et al. | 280—81 X |
| 3,129,958 | 4/1964 | Mortensen | 280—418 |
| 3,140,880 | 7/1964 | Masser | 280—104.5 X |
| 3,163,442 | 7/1964 | Bertolini | 280—80 X |

FOREIGN PATENTS 802,905   2/1951   Germany.

BENJAMIN HERSH, *Primary Examiner.*

KENNETH H. BETTS, *Examiner.*